US008594062B2

(12) United States Patent
Norefors et al.

(10) Patent No.: US 8,594,062 B2
(45) Date of Patent: Nov. 26, 2013

(54) SIP SERVER DISCOVERY IN AN INTERWORKING WLAN/IMS SYSTEM

(75) Inventors: Sven Arne Emmanuel Norefors, Stockholm (SE); Tomas Nylander, Varmdo (SE); Jari Tapio Vikberg, Jarna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 269 days.

(21) Appl. No.: 12/867,968

(22) PCT Filed: Feb. 18, 2008

(86) PCT No.: PCT/SE2008/050190
§ 371 (c)(1), (2), (4) Date: Sep. 1, 2010

(87) PCT Pub. No.: WO2009/104999
PCT Pub. Date: Aug. 27, 2009

(65) Prior Publication Data
US 2010/0329226 A1    Dec. 30, 2010

(51) Int. Cl.
*H04W 4/00*    (2009.01)
*H04L 12/28*   (2006.01)

(52) U.S. Cl.
USPC ....... 370/338; 370/328; 370/395.21; 370/401

(58) Field of Classification Search
None
See application file for complete search history.

(56) References Cited

U.S. PATENT DOCUMENTS

2005/0159156 A1    7/2005  Bajko et al.
2005/0283832 A1*  12/2005  Pragada et al. ............ 726/12
2007/0133467 A1*   6/2007  Hsu et al. .................. 370/331
2007/0206557 A1*   9/2007  Iyer et al. .................. 370/338
2008/0107119 A1*   5/2008  Chen et al. ............. 370/395.21
2008/0198861 A1*   8/2008  Makela ...................... 370/401

FOREIGN PATENT DOCUMENTS

WO    2006095269 A1    9/2006

OTHER PUBLICATIONS

3GPP TS 23.228 V8.3.0 (Dec. 2007), 3rd Generation Partnership Project; Technical Specification Group Services and System Aspects; IP Multimedia Subsystem (IMS); Stage 2 (Release 8), pp. 1-2, 50-51; Retrieved from the Internet: http://www/3gpp.org/ftp/Specs/html-info/23228.htm section 5.1.1; abstract.
3GPP TS 24.229 V8.3.0 (Mar. 2008), 3rd Generation Partnership Project; Technical Specification Group Core Network and Terminals; IP Multimedia call control protocol based on Session Initiation Protocol (SIP) and Session Description Protocol (SDP); Stage 3, (Release 8), pp. 1-2, 195, 410-412; Retrieved from the Internet: www.3gpp.org/ftp/Specs/html-info/24229.htm section 9.2.1; annex D; abstract.
3GPP, ETSI TS 123 234 V7.6.0, Jan. 2008, 8 pages.
3GPP, ETSI TS 124 229 V7.10.0, Jan. 2008, 11 pages.
Office Action and English translation from Chinese Patent Application No. 200880126998.2; dated Nov. 29, 2012; 17 pages.

* cited by examiner

*Primary Examiner* — Yemane Mesfin
*Assistant Examiner* — Diane Lo
(74) *Attorney, Agent, or Firm* — Rothwell, Figg, Ernst & Manbeck, P.C.

(57) ABSTRACT

The present invention relates to a node and a method for transmitting initiation information related to a SIP-proxy server between an IMS-client stored in a user equipment (UE) and a Gateway GPRS Support Node (GGSN) via a Access Network (AN) and a Tunnelling Termination Gateway (TTG) node in IP core network. The present invention offers smooth transfer between different protocols and Interworking between different networks.

15 Claims, 19 Drawing Sheets

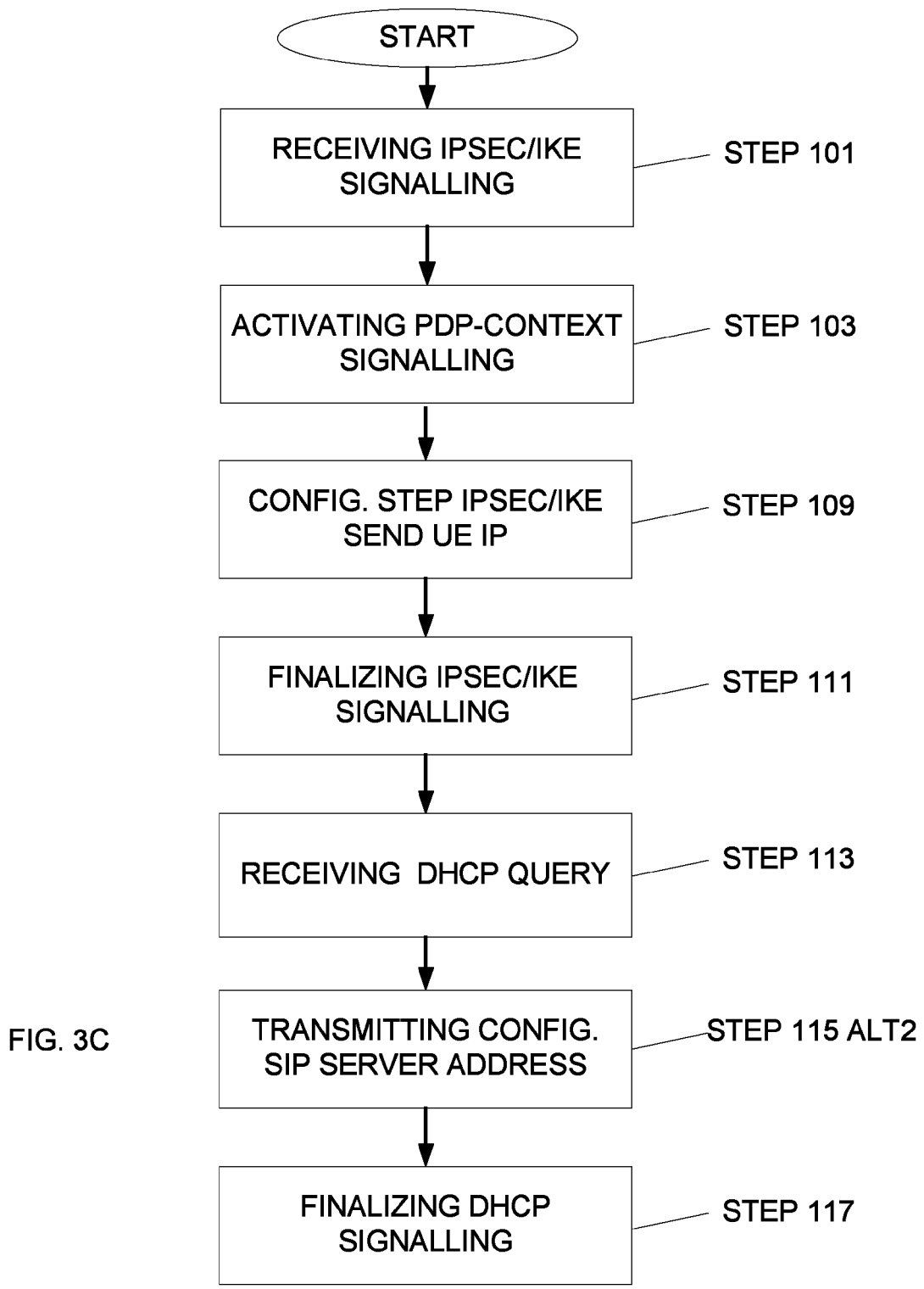

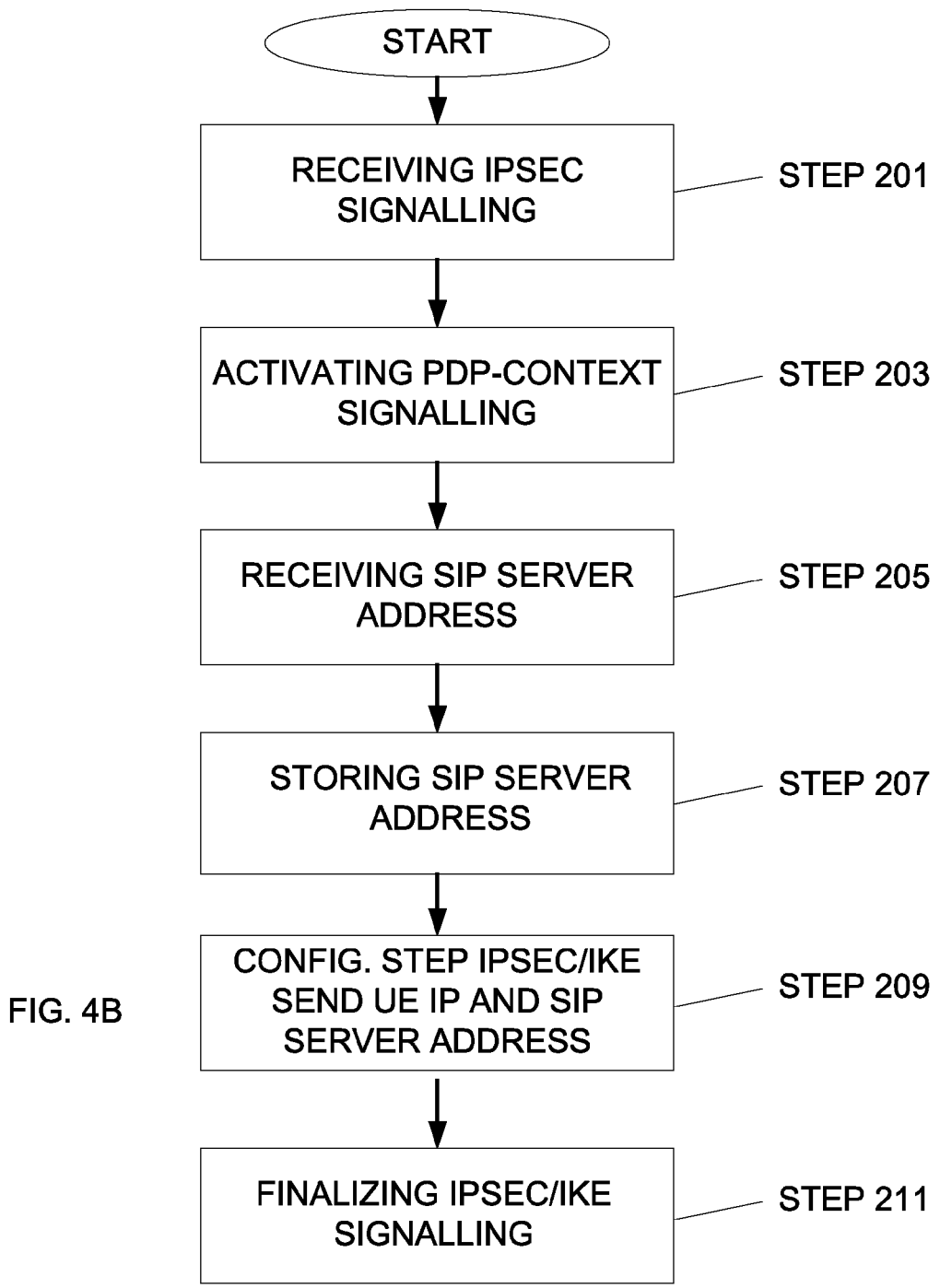

SIP SERVER DISCOVERY IN AN INTERWORKING WLAN/IMS SYSTEM

CROSS-REFERENCE TO RELATED APPLICATION

This application is a 35 U.S.C. §371 National Phase Entry Application from PCT/SE2008/050190, filed Feb. 18, 2008, and designating the United States.

TECHNICAL FIELD

The present invention relates to Interworking WLAN, and more particular to a method and a node for transmitting initiation information.

BACKGROUND

IP Multimedia (IPMM) is an example of a service which provides a dynamic combination of voice, video, messaging, data, etc, within the same session. By growing the numbers of basic applications and the media which it is possible to combine, the number of services offered to the end users will grow, and the inter-personal communication experience will be enriched. This will lead to a new generation of personalized, rich multimedia communication services, e.g. peer-to-peer multimedia communication, IPTV etc. These services can be based on the IP Multimedia Subsystem (IMS) architecture, which is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328. and TS 29.329). The IMS makes use of the Session Initiation Protocol (SIP) to set up and control calls or sessions between user terminals (or user terminals and application servers). The Session Description Protocol (SDP), carried by SIP signaling, is used to describe and negotiate the media components of the session. Other multimedia applications which can be used for media transmission and control include Real-time Transport Protocol and Real-time Transport Control Protocol (RTP/RTCP), Message Session Relay Protocol (MSRP), and Hyper Text Transfer Protocol (HTTP). 3GPP2 and TISPAN describe support to access IMS infrastructure and services from other access networks than General Packet Radio Service (GPRS), such as CDMA2000. (Code Division Multiple Access 2000) and fixed line.

Several roles of Session Initiation Protocol servers or proxies, collectively called Call Session Control Function CSCF, are used to process Session Initiation Protocol SIP signalling packets in the IMS.

A Proxy-CSCF (P-CSCF) is a SIP proxy that is the first point of contact for a user terminal. It can be located either in the visited network or in the home network, when the visited network is not yet IMS compliant. The user terminal discovers its P-CSCF with either Domain Host Configuration Protocol (DHCP), or by signalling related to activation of PDP Context (Packet Data Protocol Context), as in GPRS, wherein the P-CSCF is assigned to the terminal. It is assigned to an terminal during SIP registration. It is situated on the path of signalling messages, and can inspect every message. It authenticates the user and establishes an IPsec security association with the user terminal. The Serving CSCF (S-CSCF) is a SIP proxy which provides services to the user that the user is subscribed to; and the Interrogating CSCF (I-CSCF) is a SIP proxy whose role is to identify the correct S-CSCF and to forward to that S-CSCF a request received from a SIP terminal via a P-CSCF.

A mobile user terminal with dual mode card is capable to access and operate under both WLAN and for example UMTS or GSM frequency bands and modulation schemes. For getting access to the packet core network Interworking WLAN (I-WLAN) technology has been introduced by 3GPP (see for instance Technical Specification TS 23.234). I-WLAN consists of two main parts:
 Direct IP access:
 3GPP IP access with data through a Packet Data Gateway PDG.

It is possible to configure the PDG in different ways. One solution is a two node implementation comprising a Tunnel Termination Gateway TTG and a Gateway GPRS Support Node GGSN. IKEv2. signalling is used for establishing the IPsec tunnel between the user terminal and the TTG.

A 3GPP user terminal with IMS client accessing packet core network via a traditional Radio Access Network RAN (e.g. GSM EDGE Radio Access Network, GERAN, or Universal Terrestrial Radio Access Network, UTRAN) and the Packet Switched (PS) domain will receive the P-CSCF address when activating the PDP context. This information is included in the Protocol Configuration Options (PCO) Information Element (IE) in the Activate PDP Context Accept message that the terminal receives from SGSN. SGSN receives the P-CSCF address information from the GGSN.

An IMS client using I-WLAN 3GPP IP Access needs to also obtain the relevant initiation information, in this case the P-CSCF address, to be able to access the IMS infrastructure and services. However, there is no specified way to forward the P-CSCF address to the terminal once it is received in the TTG from the GGSN. It is an advantage that the terminals receive the same IMS server information when using the different access networks.

SUMMARY

The object of the present invention is to provide an IMS client using I-WLAN 3GPP IP Access with the address information of the P-CSCF SIP proxy.

Therefore, the present invention provides a method for transmitting initiation information related to a SIP-proxy server between an IMS-client, stored in a user equipment (UE), and a Gateway GPRS Support Node (GGSN) via an Access Network (AN) and a Tunnelling Termination Gateway (TTG) node in an IP core network. Said method comprises the steps of receiving IPsec/IKE signalling in said TTG node from the UE and activating PDP-context signalling comprising a request for initiation information towards the GGSN node in response to said UE signalling. Further, the method comprises the steps of receiving from the GGSN node initiation information comprising a SIP-proxy server address information and receiving a DHCP-query concerning the SIP-proxy server address information from said UE after said IPsec/IKE signalling has been completed. The TTG node transmits the SIP-proxy server address information (P-CSCF-address) in response to said DHCP-query to said UE.

Another aspect of the present invention, the method is comprising the steps of receiving IPsec/IKE signalling in the TTG node from the UE and activating PDP-context signalling comprising a request for initiation information towards the GGSN node in response to said IPsec/IKE signalling. The method further comprises the steps of receiving from the GGSN node initiation information comprising a SIP-proxy server address information. The TTG transmits during the finalization of the IPsec/IKE signalling procedure the SIP-proxy server address information to the UE.

Therefore, the present invention also provides a node configured to communicate initiation information related to a SIP-proxy server between an IMS-client stored in a user equipment (UE) and a Gateway GPRS Support Node (GGSN) via an Access Network (AN) and said node in an IP core network. The node comprises receiving means for receiving IPsec/IKE signalling in said node from said UE, and means for activating PDP-context signalling comprising a request for initiation information towards said GGSN node in response to the IPsec/IKE signalling. The node is further configured with means for receiving from the GGSN node initiation information comprising a SIP-proxy server address information (PCO comprises P-CSCF address(-es)) and storing this information for later usage. The node is further comprising means for receiving a DHCP-query concerning said SIP-proxy server address information from the UE after said IPsec/IKE signalling has been completed, and means for transmitting said stored SIP-proxy server address information (P-CSCF-address) in response to the DHCP-query to said UE.

According to another aspect of the present invention, said node comprises receiving means for receiving signalling in the node from the UE, and means for activating PDP-context signalling comprising a request for initiation information towards said GGSN node in response to said IPsec/IKE signalling. The node is configured with means for receiving from the GGSN node initiation information comprising a SIP-proxy server address information and for storing this information for later usage. The node is further comprising transmitting means for transmitting during the finalization of the IPsec/IKE signalling procedure said SIP-proxy server address information (P-CSCF-address) to the UE.

Yet another aspect of the present invention is a method for transmitting initiation information related to a SIP-proxy server between an IMS-client stored in a user equipment (UE) and a Gateway GPRS Support Node (GGSN) via a Access Network (AN) and a Tunnelling Termination Gateway (TTG) node in IP core network. The TTG node receives IPsec/IKEv2. signalling from the UE and activates a PDP-context signalling comprising a request for initiation information towards the GGSN node in response to said UE IPsec/IKE signalling. The TTG receives a DHCP-query concerning the SIP-proxy server address information from the UE after the IPsec/IKE signalling has been completed and relays the DHCP-query to a pre-defined node entity comprising the SIP-proxy server address information. When the node has received a response comprising the requested SIP-proxy server address information, it transmits the SIP-proxy server address information (P-CSCF-address) in response to said DHCP-query to said UE.

Further one aspect of the present invention is a node configured to communicate initiation information related to a SIP-proxy server between an IMS-client stored in a user equipment (UE) and a Gateway GPRS Support Node (GGSN) via an Access Network (AN) and the node in an IP core network. The node is configured for receiving IPsec/IKE signalling from said UE, and for activating PDP-context signalling comprising a request for initiation information towards the GGSN node in response to said UE IPsec/IKE signalling. Moreover, the node is adapted to receive a DHCP-query concerning the SIP-proxy server address information from the UE after the IPsec/IKE signalling has been completed, and to relay the DHCP-query to a pre-defined node entity comprising the SIP-proxy server address information and configured for receiving a response comprising the requested SIP-proxy server address information. The node is configured to transmit the SIP-proxy server address information (P-CSCF-address) in response to the DHCP-query to the UE.

Different embodiments of the invention are presented in the independent claims.

Said SIP-proxy server address information (P-CSCF-address) may be for example a Fully Qualified Domain Name (FQDN) or an IPv4. or IPv6. address.

One advantage with the present invention is that it ensures smooth transfer between different protocols and Interworking between different networks.

BRIEF DESCRIPTION OF THE DRAWINGS

FIG. 3C is a flowchart illustrating another embodiment of the present invented method.

FIG. 4B is a flowchart illustrating the embodiment of the present invented method illustrated in FIG. 4A.

DETAILED DESCRIPTION

In the following description, for purposes of explanation and not limitation, specific details are set forth, such as particular software, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
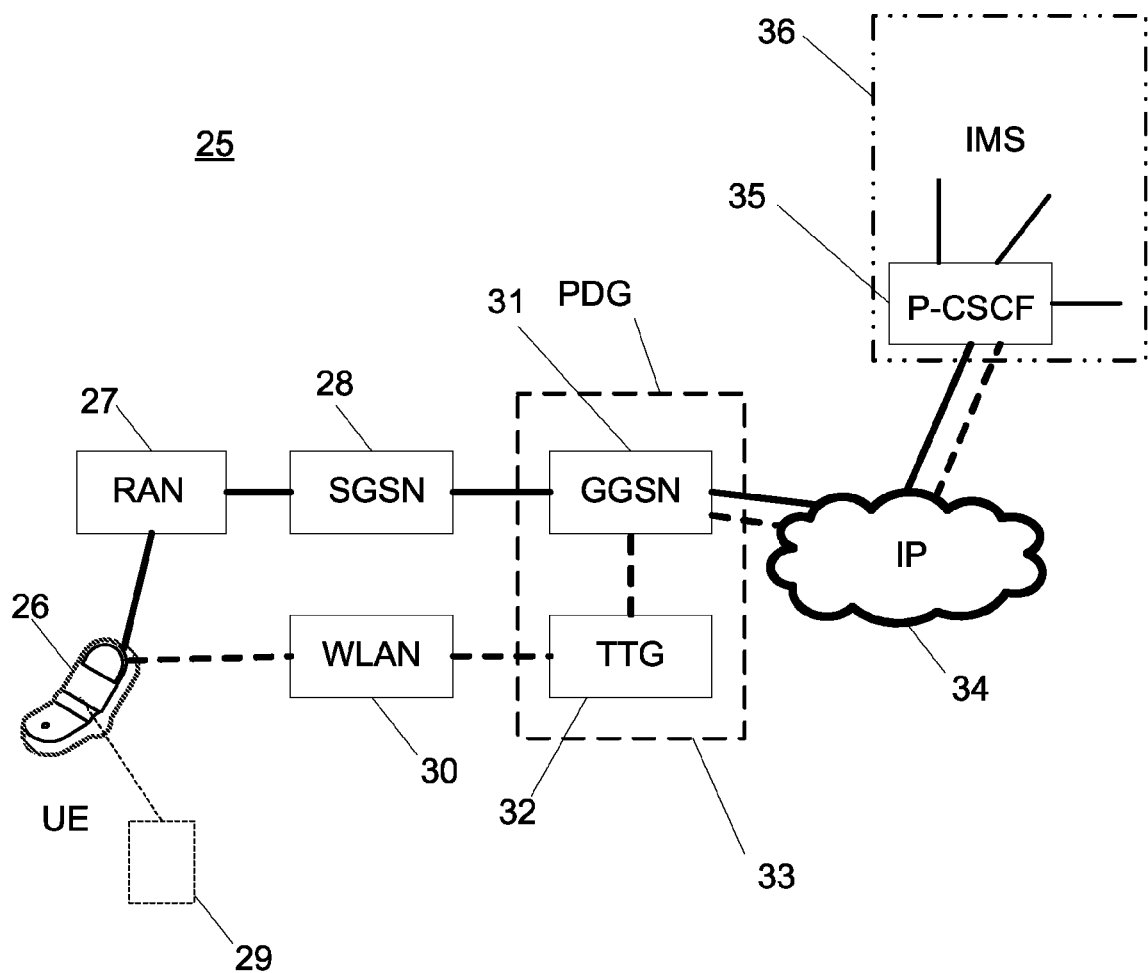
FIG. 1 is a block scheme illustrating Interworking networks and nodes according to the invention.
Figure 8:
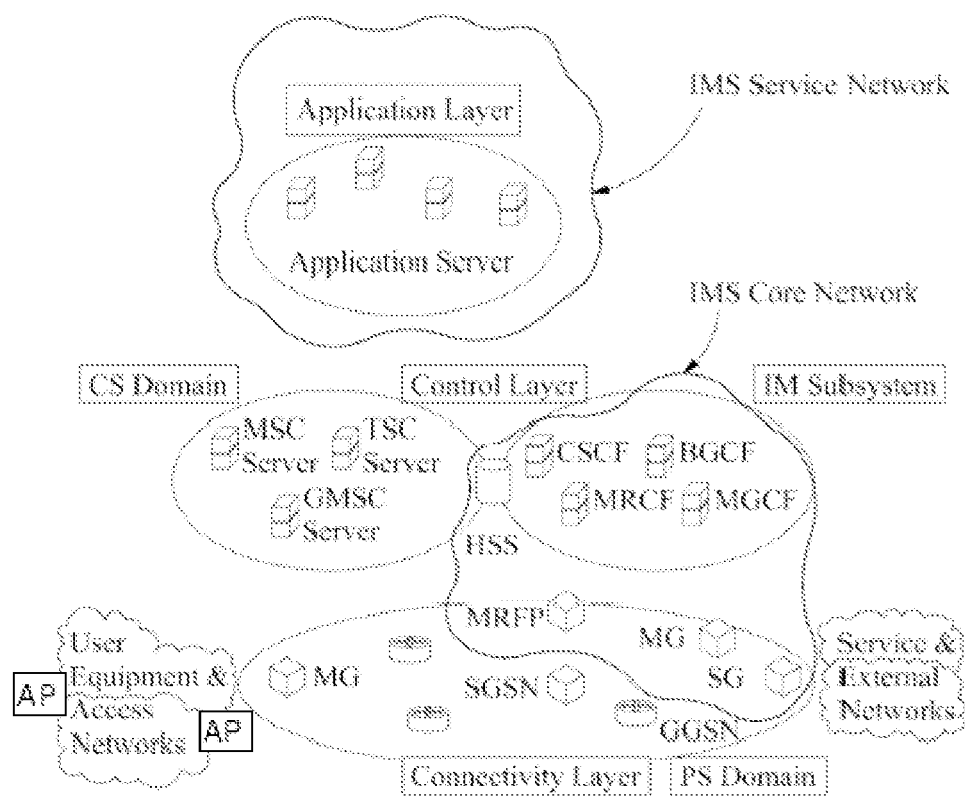
FIG. 8 is a block diagram illustrating schematically the integration of an IP Multimedia Subsystem into a 3G mobile communications system.

FIG. 1 is a block scheme illustrating interworking networks and nodes according to the invention and FIG. 8 is an example of a Network 50 supporting SIP. FIG. 8 illustrates schematically how the IMS fits into the mobile network architecture in the case of a 3GPP PS access network. Call/Session Control Functions (CSCFs) operate as SIP proxies with the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

FIG. 1 illustrates a Packet Switched PS domain 25 and a User Equipment 26 comprising an IMS client 29. The illustrated PS domain 25 comprises a system and network 50 supporting SIP, but in FIG. 1 is only the some of the most essential nodes, servers and node entities illustrated. FIG. 1 is therefore showing a strongly reduced architecture of the exemplified system and network 50 of FIG. 8. The UE attaches to one of the Access Networks, the Radio Access Network 27 (RAN) or the Wireless Local Area Network (WLAN) 30. The data packets of the signalling will be routed from either the RAN 27 via the Serving GPRS Support Node (SGSN) 28 to the Gateway GPRS Support Node (GGSN) 31, or via the WLAN 30 to the Packet Data Gateway (PDG) 33. The establishing of a session and communication of data packets is performed via standard protocol, which will be discussed in more detail. The initiation information of a SIP server, e.g. P-CSCF server 35 of a IM subsystem 36, has to be received by the UE 26 and IMS client 29, and therefore, methods for getting the necessary initiation information by interworking between the Tunnel Termination Gateway TTG 32 and the GGSN 31 of the PDG 33 is provided. Thus, the present invention provides methods for transmitting initiation information related to a SIP-proxy server 35 to an IMS-client 29 stored in a user equipment (UE) 26 via an IP network 34, a Gateway GPRS Support Node (GGSN) 31, a Tunnelling Termination Gateway (TTG) node 32 and WLAN 30.

When a User Equipment UE 26, e.g. PS-capable mobile phone, sets up a PDP (Packet Data Protocol) context, both the Access Point Name (APN) and the GGSN 31 to be used are determined by the SGSN. The selected APN is then used in a Domain Name System DNS query to a private DNS system/server by the SGSN 28. This process finally gives the IP address of the GGSN 31 which should serve as the other end point for the activated PDP context. At this point a PDP context can be activated. The PDP context is a data structure present on both the Serving GPRS Support Node SGSN and Gateway GPRS Support Node GGSN that contains the user's, i.e. subscriber's, session information when the user/subscriber has an active session. To be able to use the network and the system, a UE must first attach and then activate a PDP context. This allocates a PDP context data structure in the SGSN where the user is currently attached to and the GGSN serving the APN selected for the user. Said data record includes the subscriber's IP address, IMSI, Tunnel ID TEID at the GGSN and Tunnel ID TEID at the SGSN. The Tunnel ID TEID is a number allocated by the SGSN and the GGSN which identifies the tunnel data related to a particular PDP context in each direction.

The Proxy Call Session Control Function P-CSCF is the entry point towards the IMS network from any access network. The assignment of a P-CSCF to a user is determined by the access network configuration. In the case of UMTS/GPRS is used as the access network the allocation of the P-CSCF address takes place at PDP context activation, where the UE may use a Dynamic Host Configuration Protocol (DHCP) query to obtain the list of P-CSCFs, or the UE is provided the IP address of the P-CSCF by the GGSN (and the SGSN) in a PDP context activation message.

Figure 2:
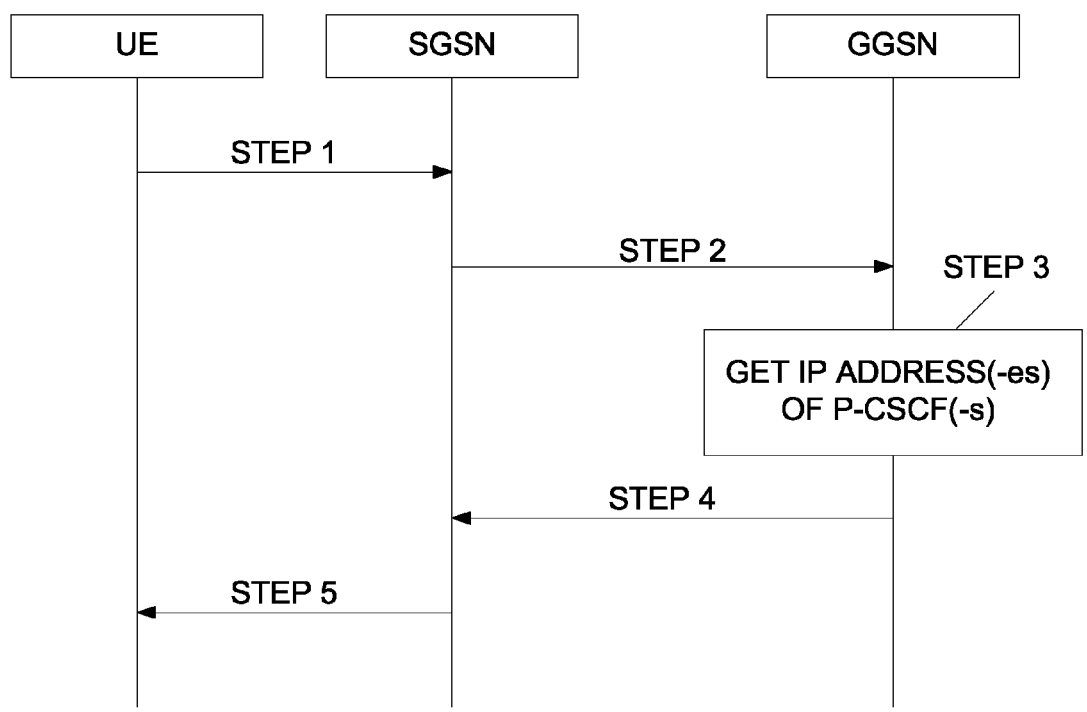
FIG. 2 is signalling scheme illustrating the activate PDP context activation process between a User Equipment UE and the Packet Switched PS domain comprising a Serving GPRS Support Node (SGSN) and a Gateway GPRS Support Node (GGSN) in the case a traditional RAN (e.g. GERAN or UTRAN) is used.

FIG. 2 is signalling scheme illustrating the activate PDP context process between a User Equipment UE 26 and the Packet Switched PS domain comprising a Serving GPRS Support Node SGSN and a Gateway GPRS Support Node GGSN in the case a traditional RAN (e.g. GERAN or UTRAN) is used.

In FIG. 2, the UE 26 transmits an Activate PDP Context request message to the SGSN node 28, Step 1. The SGSN 28 reacts on the request by sending a Create PDP Context request message to the GGSN 31, Step 2, which responds with the necessary P-CSCF IP address(-es) by transmitting a Create PDP Context Response, Step 3 and Step 4. The SGSN 28 is now able to respond, Step 5, to the UEs request by sending an Activate PDP Context Accept message comprising the P-CSCF address information.

An IMS client using I-WLAN 3GPP IP Access needs also to obtain the P-CSCF address. One of the options of the present invention is to provide a method to pass the received P-CSCF information from a Tunnelling Termination Gateway (TTG) node to the UE 26. The TTG node 32 is configured to perform Interworking between Dynamic Host Configuration Protocol (DHCP) and GPRS Tunnelling Protocol (GTP).

Figure 3A:
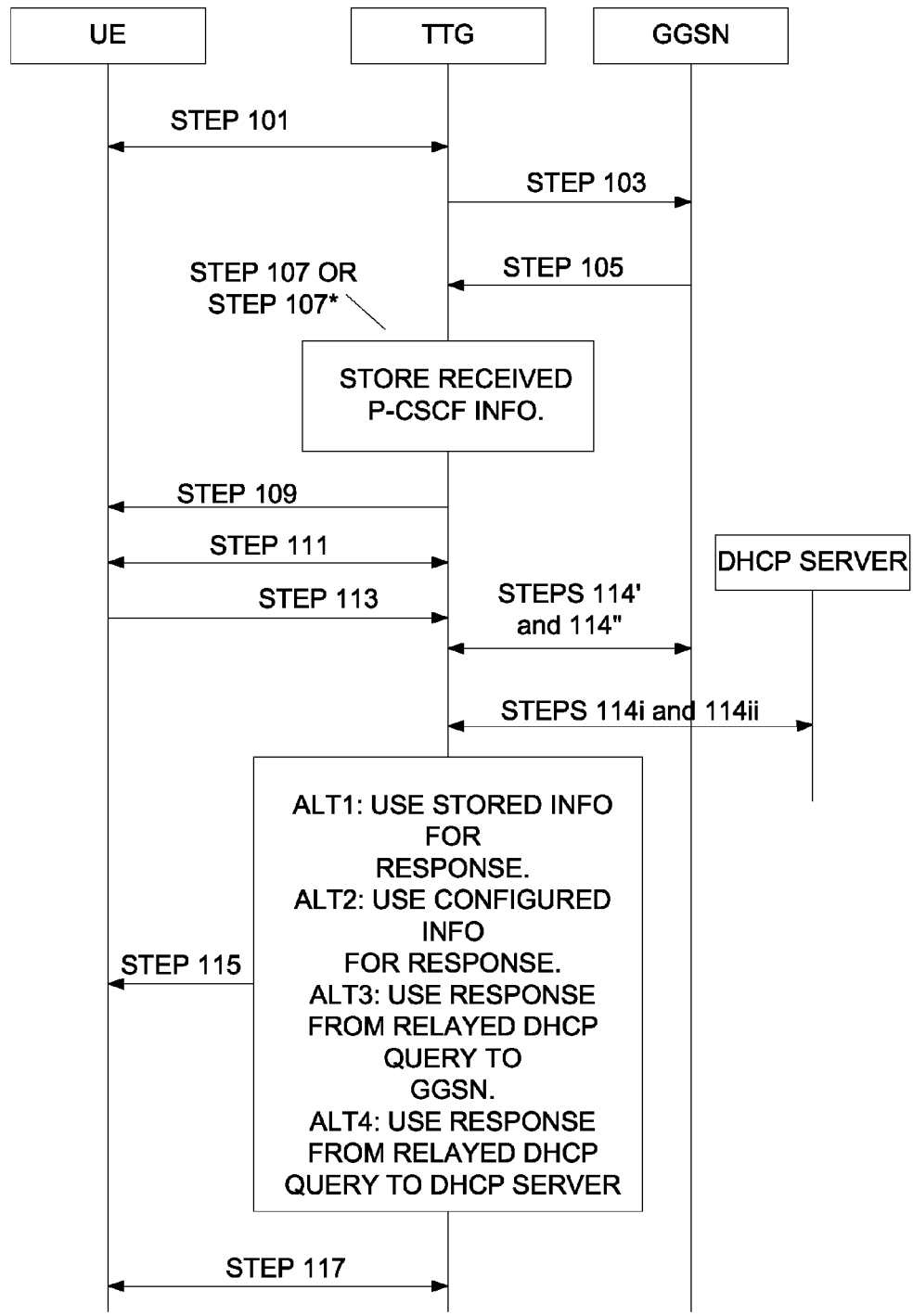
FIG. 3A is a signalling scheme illustrating different embodiments of the present invented method.

FIG. 3A is a signalling scheme illustrating several embodiments of the present invented method. FIGS. 3B-3E are flowcharts illustrating some of the different embodiments of the invention.

For establishing an IPsec tunnel between the TTG and the UE, the initial part of Internet Key Exchange (IKE) signalling is performed between the two entities. The TTG node is therefore configured to handle, i.e. receive and respond, IKE protocols, preferably IKEv2, which is an enhanced second version of the original IKEv1. protocol.

IKE (v1 and v2) is a set of protocols and mechanisms designed to perform two functions, creation of a protected environment (which includes peers authentication that are unknown to each other in advance) and to establish and manage Security Association (SA) between the authenticated peers. IKE is heart of the IPsec because it not only controls the services to be offered to secure the traffic but also manages the whole range of different transform options available at different levels and different granularity. IKE allows communicating entities to derive session keys for source communication via a series of messages exchange. IPsec protocols is designed to provide security for IPv4 and IPv6. IKE is described in a number of documents, e.g. the Request for Commands document RFC 4306 available via the internet sites: www.rfcarchive.org, or www.faqs.org.

Figure 3B:
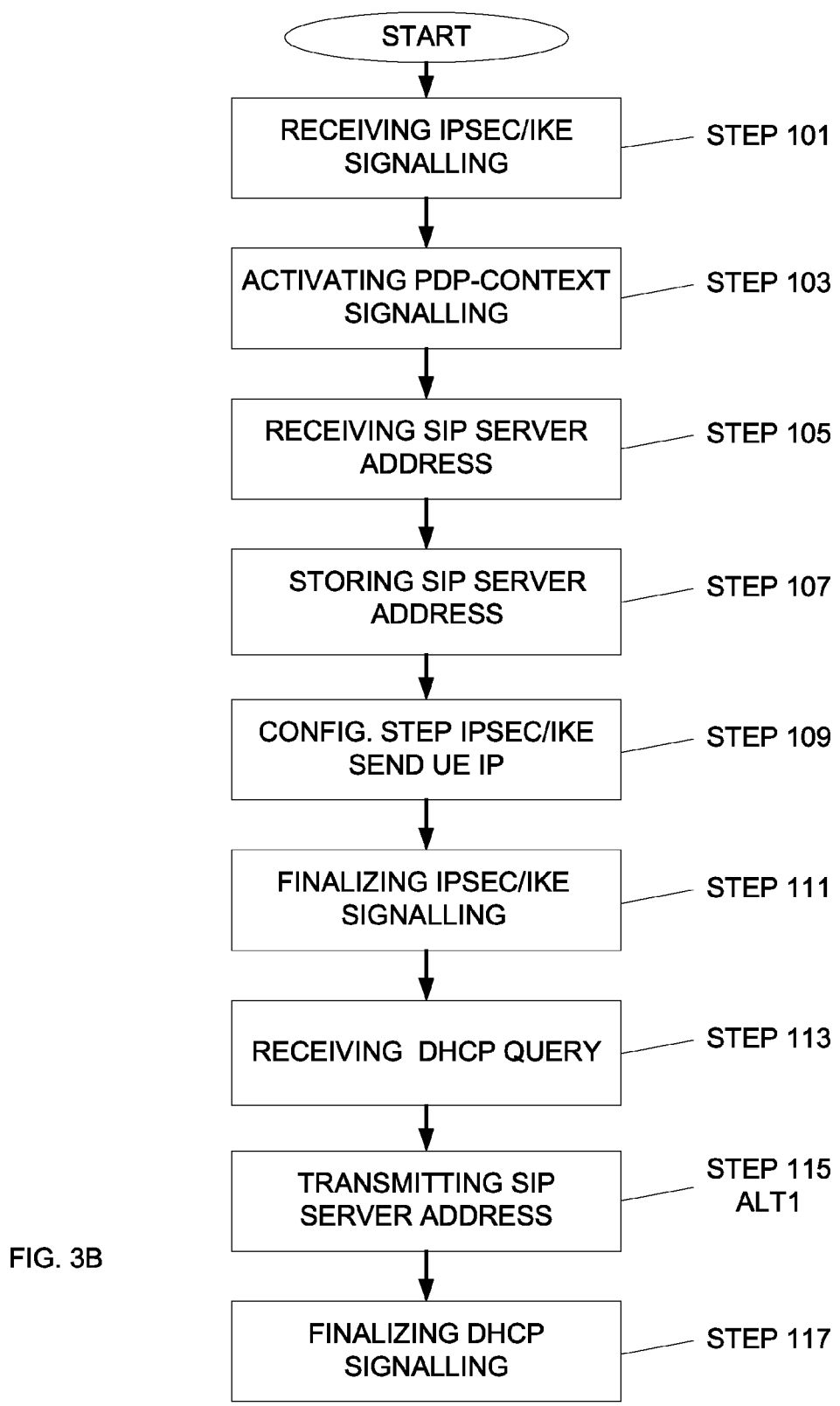
FIG. 3B is a flowchart illustrating a first embodiment of the present invented method.

Thus, as illustrated in FIGS. 3A and 3B, the first step is to start establishing an IPsec tunnel by performing the initial part of IKE signalling between the TTG node and the UE, step 101. The TTG gets aware of the of the UE identity, e.g. IMSI identity. In the next step, step 103, the TTG activates a PDP context for the UE. The TTG node is configured to activate PDP context signalling comprising a request for initiation information towards said GGSN node in response to said IPsec/IKE signalling.

In the following step, step 105, the TTG node receives from said GGSN node initiation information comprising a SIP-proxy server address information. In the PDP context activation result, e.g. Create PDP Context Response message as defined in 3GPP TS 29.060, the Protocol Configuration Options Information Elements (PCO IE) is received. In this case, the Information Elements are the allocated IP address, UE IP, for the UE and address information about the P-CSCF(s) that the IMS client should contact.

According to the invention, the TTG is configured to store received information, step 107, which also could include information regarding other DNS/DHCP servers' IP addresses.

After the storing step, the configuration part of the IPsec establishment is performed, step 109. UE IP is forwarded as "config payload" to the UE.

After the step wherein the IPsec/IKE signalling is finalized, step 111, the client issues a DHCP query in which the client might include the allocated UE IP address as an option. Said DHCP query is received by the TTG node, in step 113. The DHCP query is one of following suitable messages: DHCPDISCOVERY, DHCPREQUEST, or DHCPINFORM. Said queries are described in detail in following documents: RFC2132, RFC3361, and RFC3736. Said documents are available via the internet sites: http://www.rfcarchive.org/, or www.faqs.org.

The next step, step 115, is to transmit said stored SIP-proxy server address information, e.g. P-CSCF address, in response to said DHCP-query to said UE. However, there are several alternatives to handle DHCP query according to the invention. These different alternatives (shown as ALT1-ALT4 and as steps 114', 114", 114i. and 114ii. in FIG. 3A) are described in the FIGS. 3B to 3E and in the related descriptions.

The final step is to finalize the DHCP signalling, step 117.

In the first embodiment, as illustrated in the flowchart of FIG. 3B, the P-CSCF IP address has been received as PCO IE in the PDP context activation for the session in Step 105. The TTG replies to the DHCP query with the P-CSCF address information, step 115 ALT1 according to FIG. 3A. In addition, the TTG may be configured to convert the encoding of the received P-CSCF address information from IPv4. address to IPv6. or the other way around. E.g. the received IP address in the PCO may be an IPv4. address, encoded in an IPv6 format, in this case the TTG may need to convert to a native IPv4 address before passing it to the client. Another possibility is that the TTG passes the P-CSCF address information to the UE as it was received and then the UE performs the needed conversion (if any).

In a second embodiment of the invention, as illustrated in the flowchart of FIG. 3C, the PCO IE is not received in the PDP context activation, as in step 105 in FIG. 3B. Instead P-CSCF address information is configured/stored in TTG, step 107*. The TTG is therefore configured to read the SIP proxy address, in this case the P-CSCF address to use said information when replying to the DHCP query, step 115 ALT2 according to FIG. 3A. IMSI or part of IMSI, e.g. PLMN or clients public IP address, could be used to select P-CSCF when answering. A table is stored in the TTG wherein for example different IP subnets have different P-CSCFs defined.

Figure 3D:
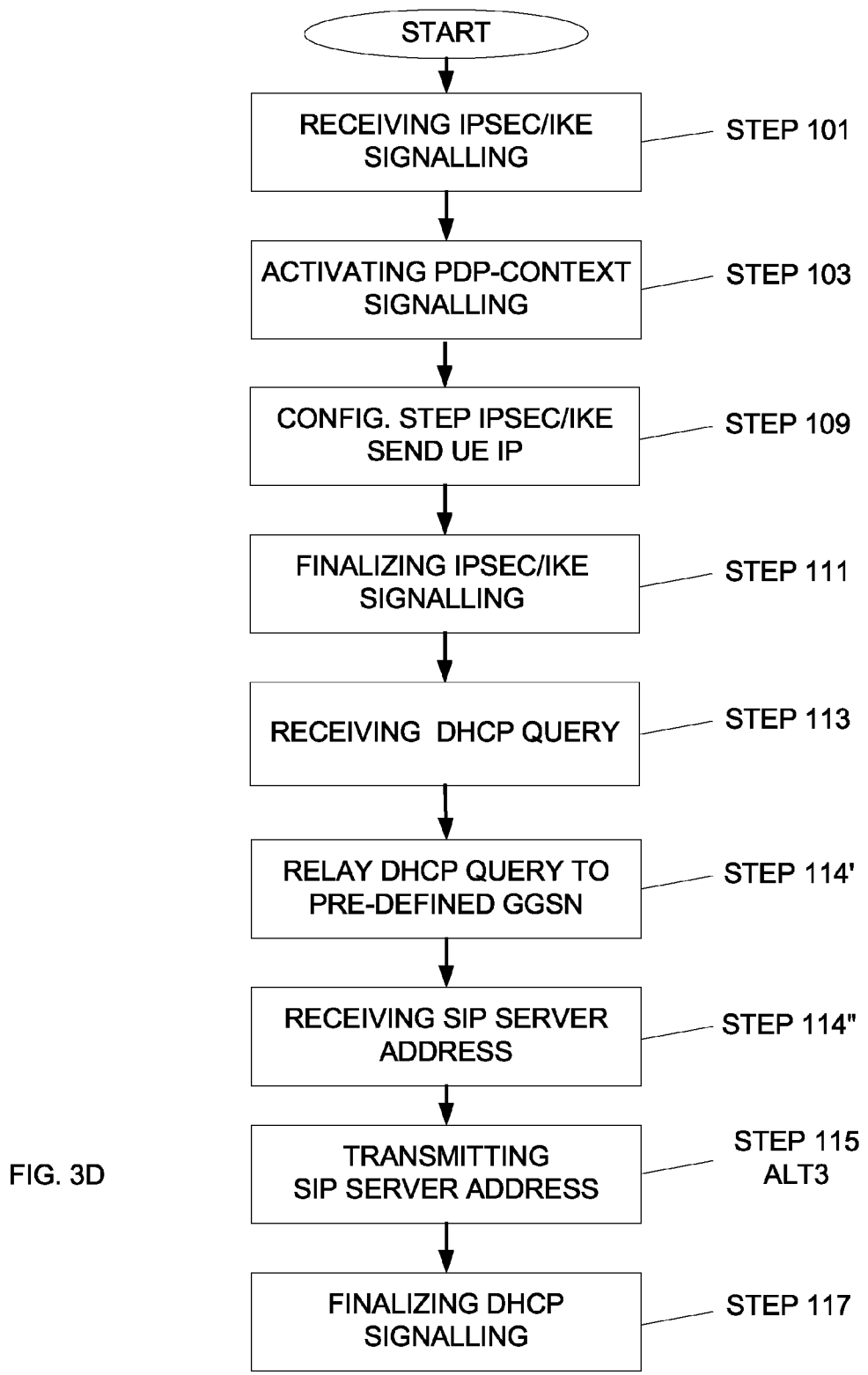
FIG. 3D is a flowchart illustrating yet another embodiment of the present invented method.

In a third embodiment of the invention, as illustrated in the flowchart of FIG. 3D, the PCO IE is not received (step 105), nor configured in the TTG. To solve the problem to get the P-CSCF address information, the TTG is configured to relay the DHCP query to a predefined GGSN, step 114'. If necessary, the TTG will insert UE IP before forwarding DHCP query to the GTP tunnel associated with client/IPsec tunnel leading to the correct GGSN. In step 114", the TTG node will receive the SIP proxy server address. The TTG is configured to send the received address to the UE, in step 115 ALT3 according to FIG. 3A.

Figure 3E:
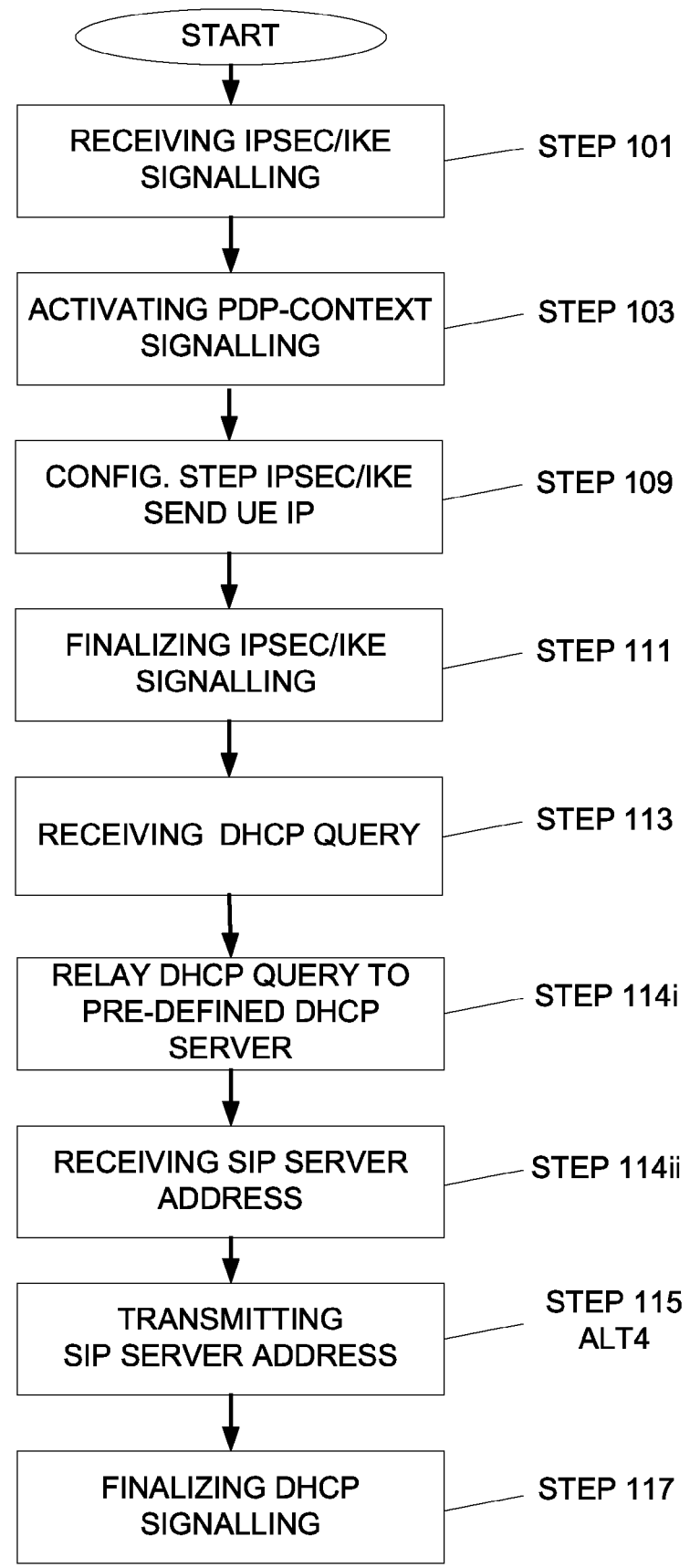
FIG. 3E is a flowchart illustrating a forth embodiment of the present invented method.

Alternatively, if the GGSN do not support monitoring of the user data, i.e. looking for DHCP queries, on the GTP tunnel or cannot handle the extra load caused by the monitoring, the TTG could be configured to look for and route the query to a predefined DHCP server, possibly through intermediate networks. This process is a fourth embodiment of the invention, and it is illustrated in the flowchart of FIG. 3E. IMSI or part of IMSI, e.g. PLMN or client IP address could be used to select the destination DHCP server. The TTG is configured to relay the DHCP query to a predefined DHCP server, step 114i.. In step 114ii, the TTG node will receive the SIP proxy server address from the DHCP server. The TTG is configured to send the received address to the UE, in step 115 ALT4 according to FIG. 3A.

Figure 4A:
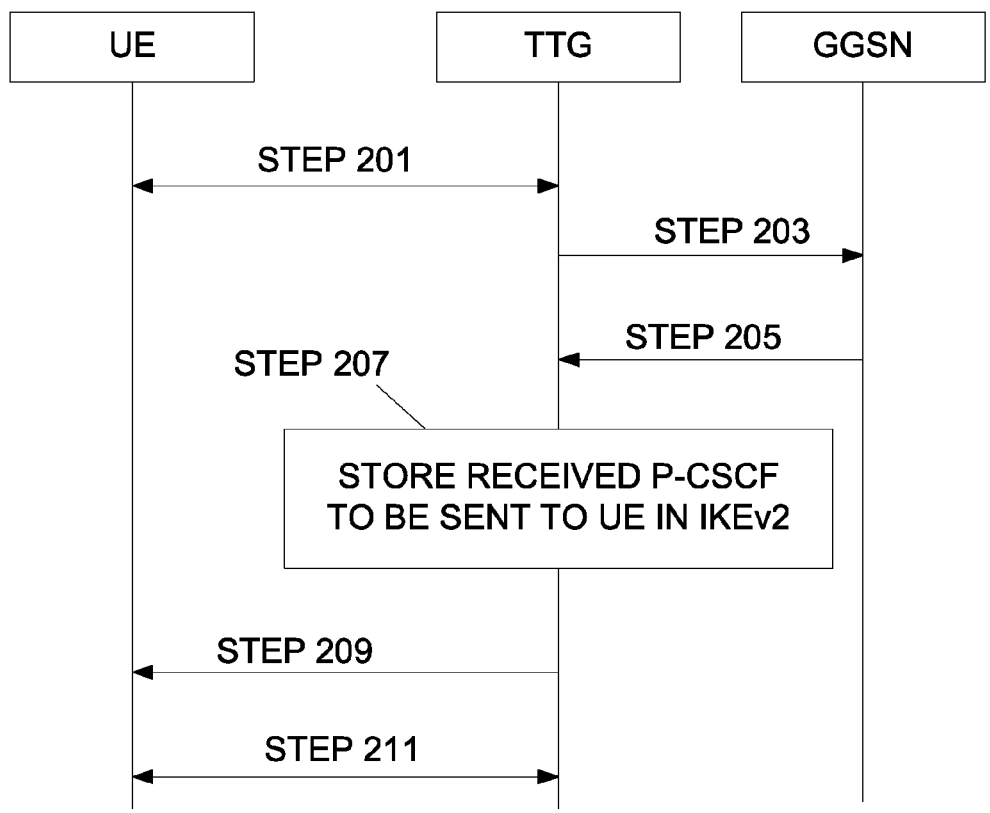
FIG. 4A is a signalling scheme illustrating further one embodiment of the present invented method.

In further one alternative embodiment of the invention, illustrated in FIG. 4A, the TTG is configured to perform Interworking between IKEv2. and GTP protocols. The main difference between the above described embodiment of the invention and the alternative embodiment to be described is that the DHCP query process is eliminated in the alternative embodiment.

FIG. 4A is a signalling scheme illustrating another embodiment of the present invented method, which also is illustrated in a corresponding flowchart in FIG. 4B.

As described above, the first step 201 is to start establishing an IPsec tunnel by performing the initial part of IKE signalling between the TTG node and the UE. The TTG gets aware of the UE identity, e.g. IMSI identity. In the next step, step 203, the TTG requests activation of a PDP context for the UE. The TTG node is configured to activate PDP-context signalling comprising a request for initiation information towards said GGSN node in response to said UE (IPsec/IKE) signalling.

In the following step, step 205, the TTG node receives from said GGSN node initiation information comprising a SIP-proxy server address information, such as the P-CSCF address. In the PDP context activation result, e.g. Create PDP Context Response message as defined in 3GPP TS 29.060, the Protocol Configuration Options Information Elements (PCO IE) is received. In this case, the Information Elements are the allocated IP address, UE IP, for the UE and information about the P-CSCF(s) that the IMS client should contact.

According to the invention, the TTG is configured to store received information, step 207, which also could include information regarding other DNS/DHCP servers' IP addresses.

After the storing step, the configuration part of the IPsec establishment is performed, step 209. According to the alternative embodiment of the invention, the protocol is adapted and configured to forward IP options, e.g. IP addresses, as "config payload". UE IP and P-CSCF information is forwarded as "config payload" to the UE. The IKE protocols could be enhanced with the described payload extension.

The IPsec/IKE signalling is finally finalized, step 211.

Said SIP-proxy server address information (P-CSCF-address) may be for example a Fully Qualified Domain Name (FQDN) or an IPv4. or IPv6. address.

Figure 4C:
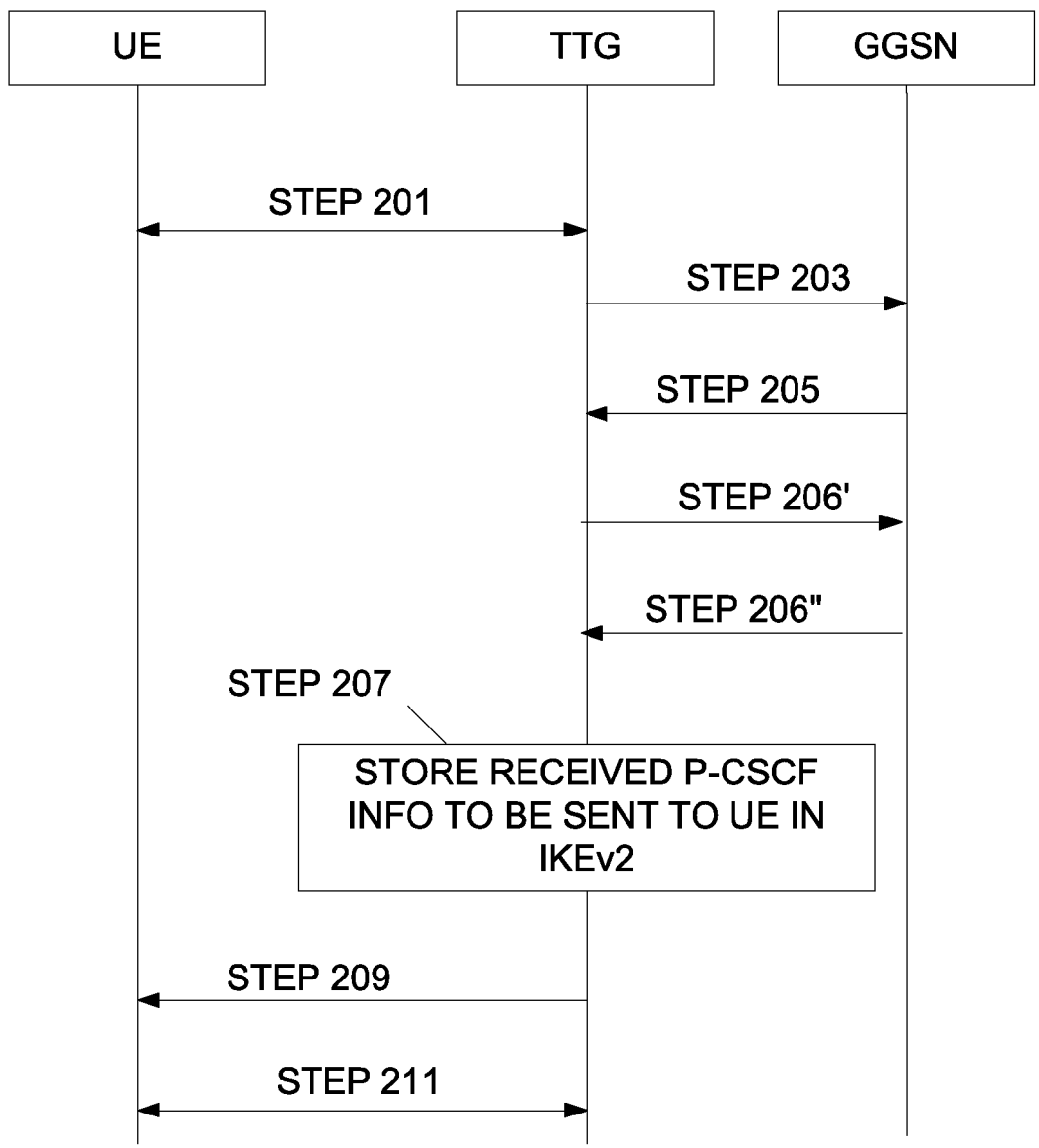
FIG. 4C is a signalling scheme illustrating further one embodiment of the present invented method.
Figure 4D:
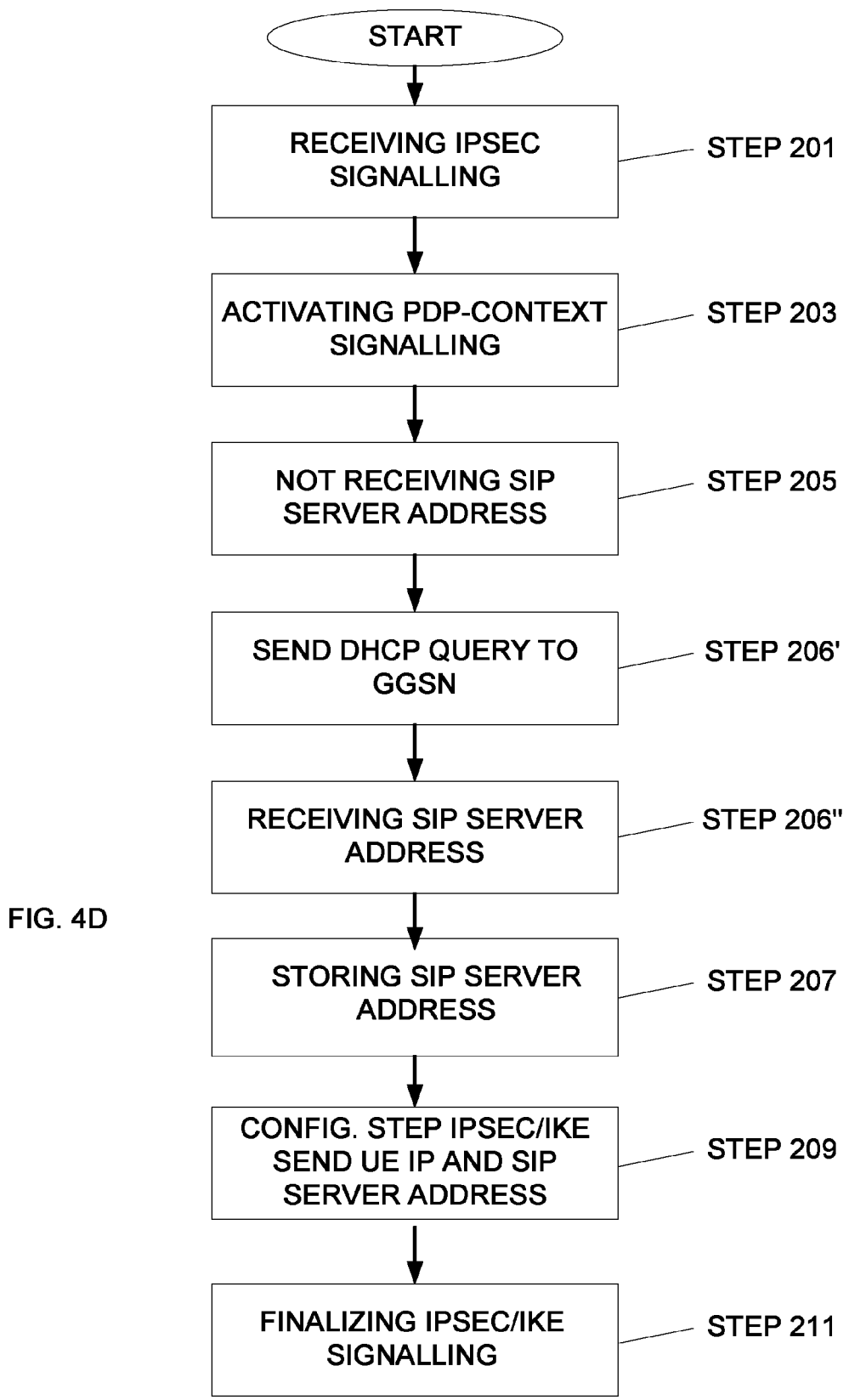
FIG. 4D is a flowchart illustrating the embodiment of the present invented method illustrated in FIG. 4C.

FIG. 4C is a signalling scheme illustrating another embodiment of the present invented method, which also is illustrated in a corresponding flowchart in FIG. 4D.

In further one alternative embodiment of the invention, illustrated in FIG. 4C, the TTG is configured to perform Interworking between IKEv2. and GTP protocols. The main difference between the above described embodiment of the invention according to FIGS. 4A and 4B and the alternative embodiment to be described is that the DHCP query process is located to the TTG node in the alternative embodiment. Steps 201, 203, and 205 are common for the the two embodiments.

If the TTG node does not receive initiation information comprising a SIP-proxy server address information, such as the P-CSCF address, from said GGSN node, the TTG node is configured to generate and send a DHCP query to the GGSN node comprising a DHCP server, in step 206'. In step 206", the TTG node will receive the SIP proxy server address from the DHCP server in the GGSN node. Hereafter the final steps 207, 209, and 211 are performed as in the embodiment according to FIGS. 4A and 4B.

FIG. 4C is a signalling scheme illustrating another embodiment of the present invented method, which also is illustrated in a corresponding flowchart in FIG. 4D.

Figure 4E:
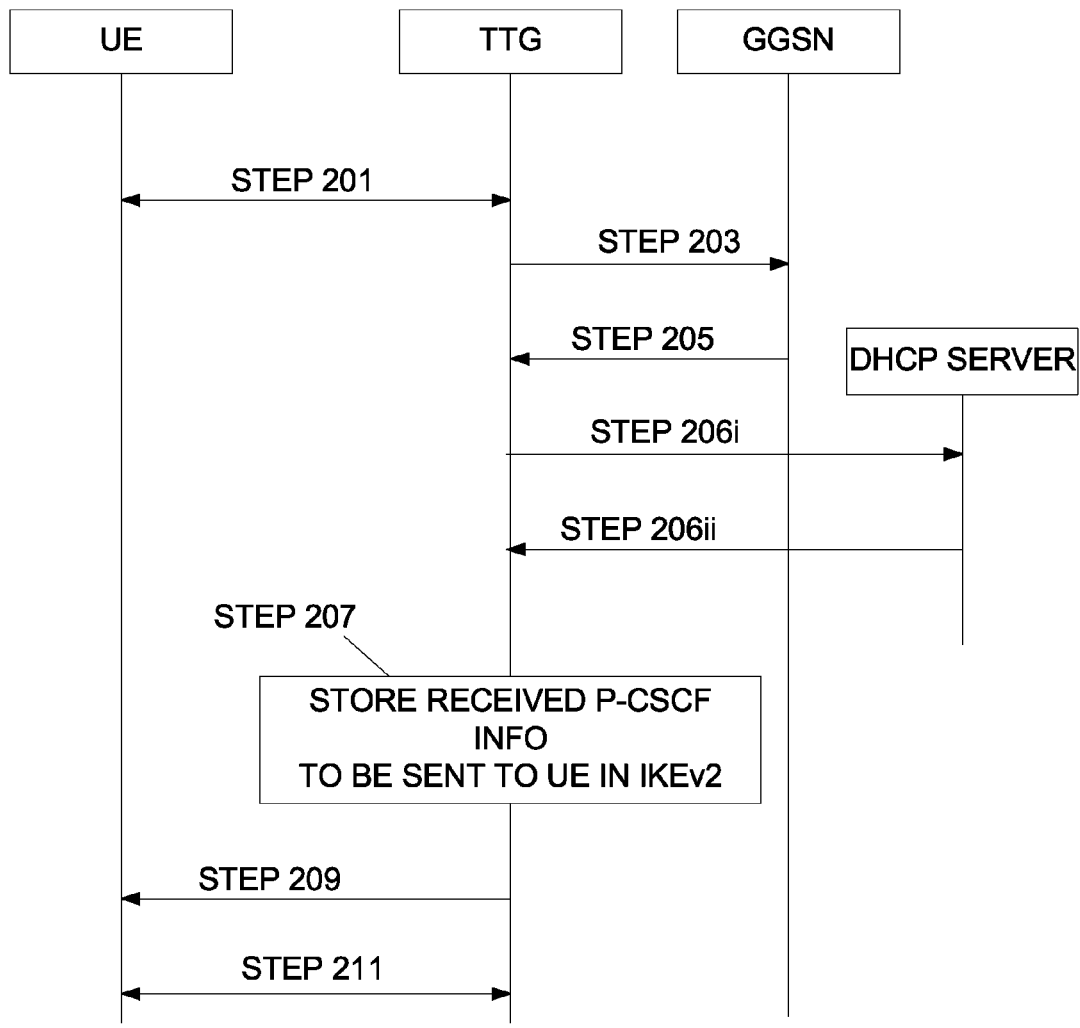
FIG. 4E is a signalling scheme illustrating further one embodiment of the present invented method.
Figure 4F:
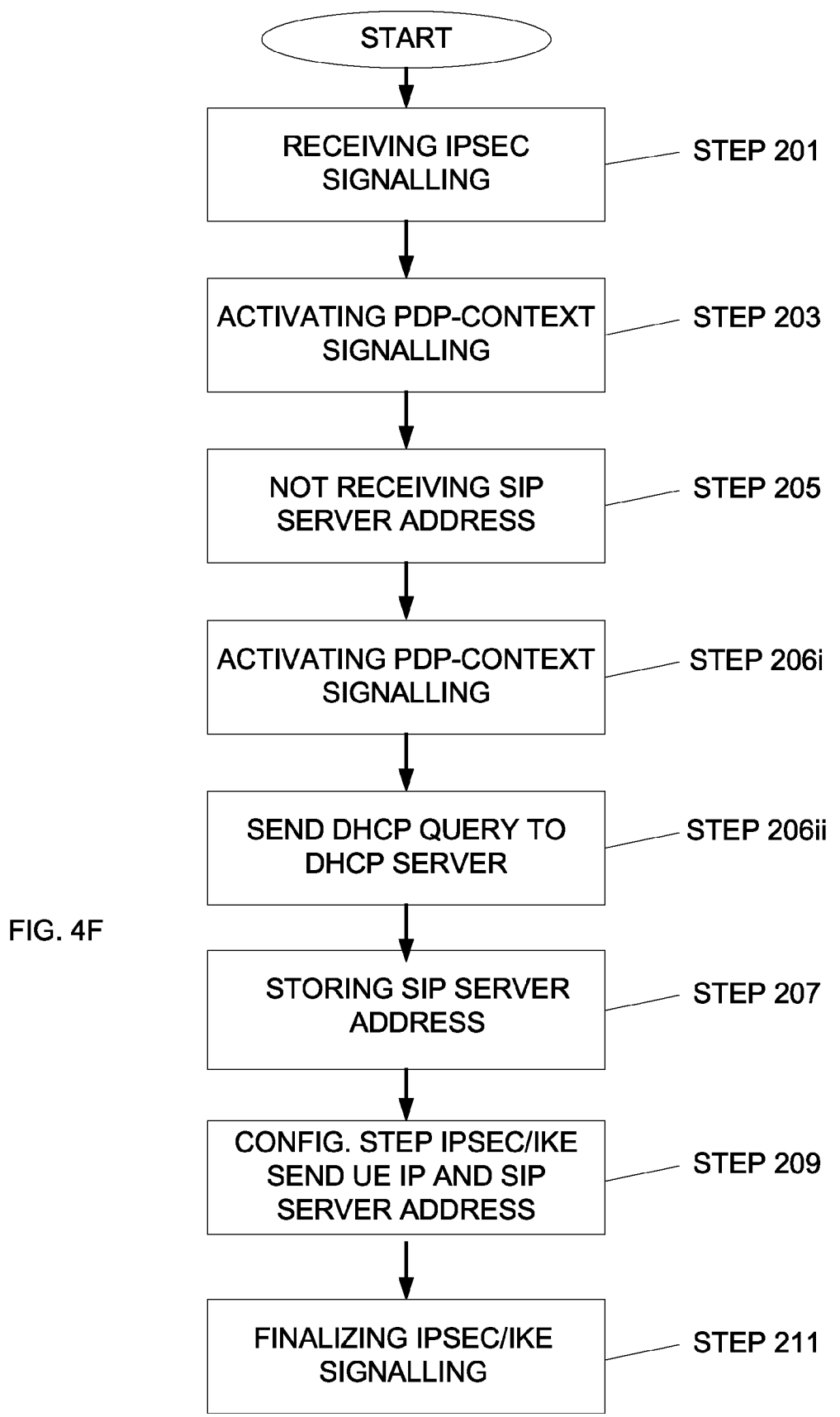
FIG. 4F is a flowchart illustrating the embodiment of the present invented method illustrated in FIG. 4E.

Further one alternative embodiment of the invention will now be described with reference to FIGS. 4E and 4F. The TTG is configured to perform Interworking between IKEv2. and GTP protocols as in the examples described in FIGS. 4A-4B, and 4C-4D, respectively. As in the embodiment of the invention according to FIGS. 4C and 4D, the alternative embodiment to be described with reference to FIGS. 4E and 4F, the DHCP request process is located to the TTG node. However, the TTG will not address and forward the DHCP request to a DHCP server in a GGSN node.

Steps 201, 203, and 205 are common for all three embodiments. If the TTG node does not receive initiation information comprising a SIP-proxy server address information, such as the P-CSCF address, from said GGSN node, the TTG node is configured to generate and send a DHCP query to a predetermined DHCP server, in step 206'. In step 206", the TTG node will receive the SIP proxy server address from the addressed DHCP server. Hereafter the final steps 207, 209, and 211 are performed as in the embodiment according to FIGS. 4A and 4B.

Figure 4G:
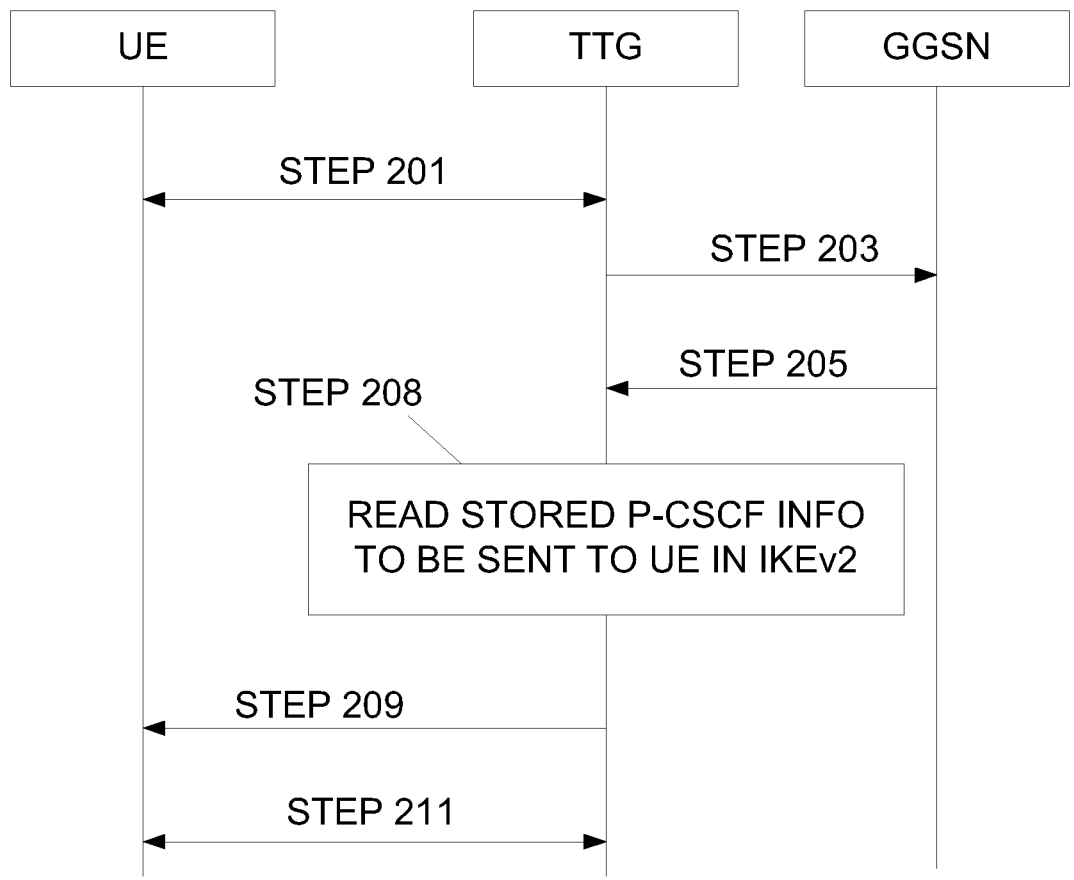
FIG. 4G is a signalling scheme illustrating further one embodiment of the present invented method.
Figure 4H:
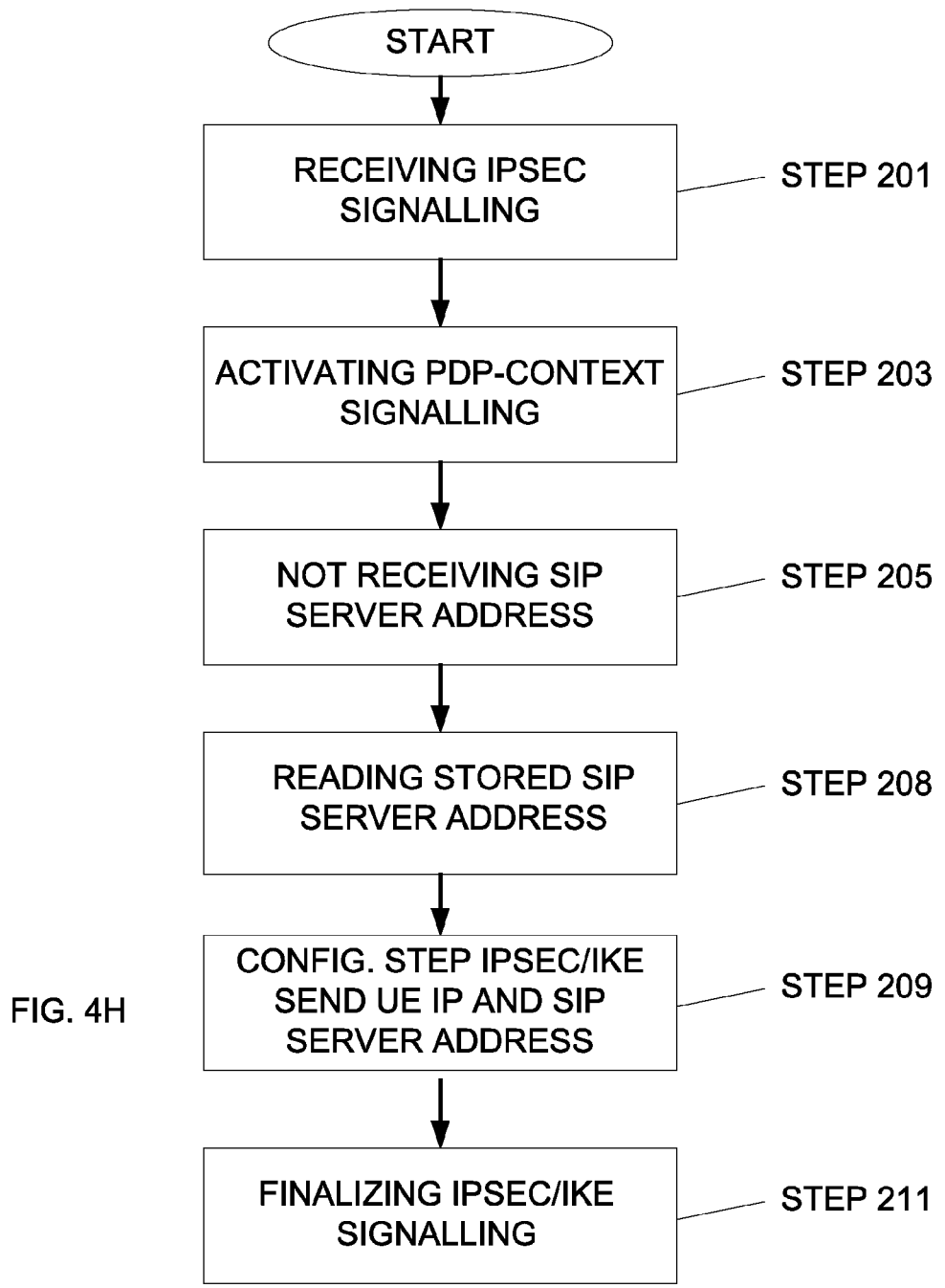
FIG. 4H is a flowchart illustrating the embodiment of the present invented method illustrated in FIG. 4A.

Further one alternative embodiment of the invention will now be described with reference to FIGS. 4G and 4H. The TTG is configured to perform Interworking between IKEv2. and GTP protocols as in the examples described in FIGS. 4A-4B. In the embodiment according to FIGS. 4G and 4H, the TTG node is configured with SIP-proxy server address information, e.g. a stored P-CSCF address.

Steps 201, 203, and 205 are similar with the three described embodiments described with reference to FIGS. 4A to 4F. As stated above, in this embodiment the TTG node is configured with SIP-proxy server address information. But, in step 208, the TTG is configured to read the configured/stored SIP-proxy server information Hereafter the final steps 209 and 211 are performed as in the embodiment according to FIGS. 4A and 4B.

Figure 5:
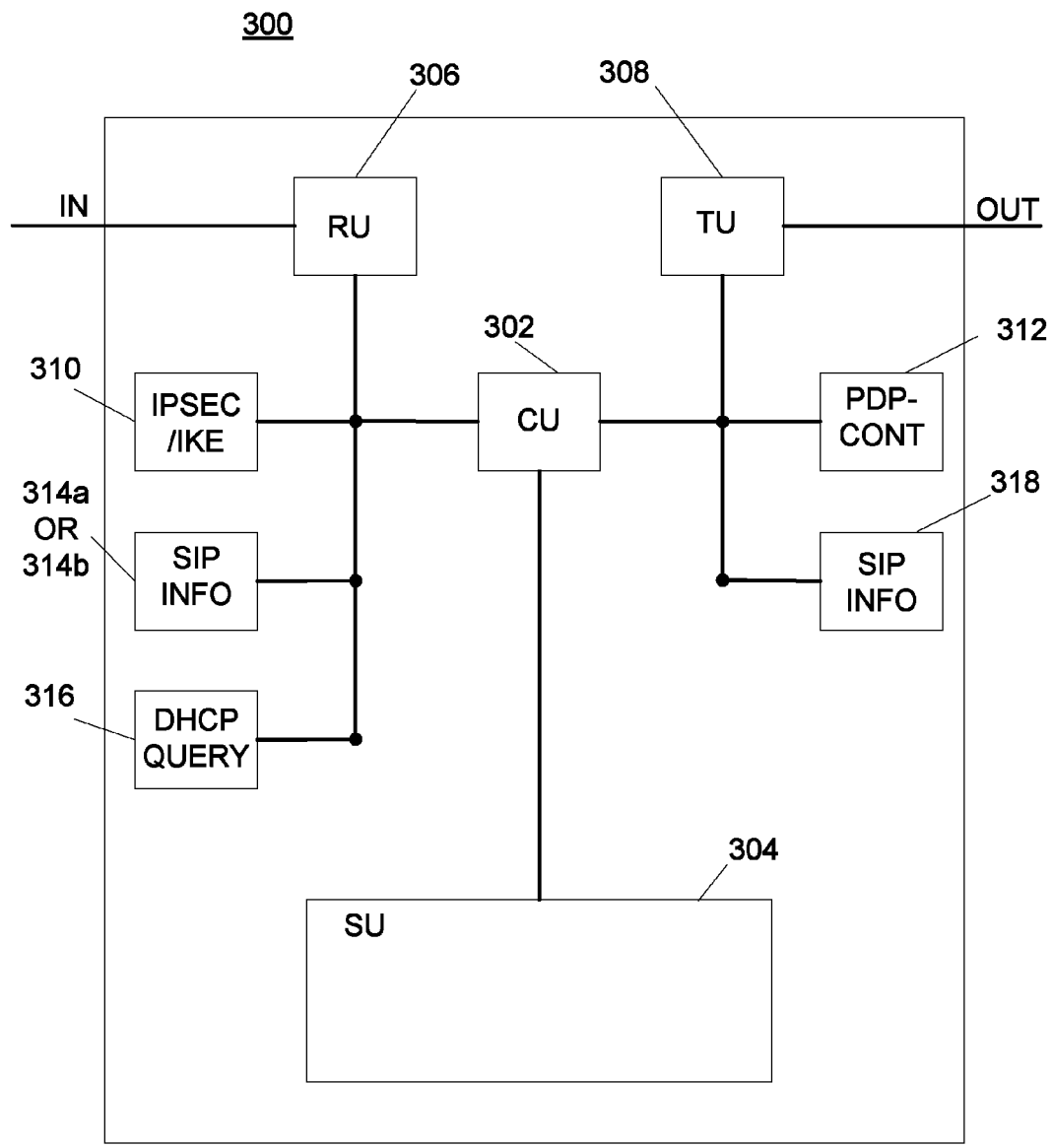
FIG. 5 is a block diagram illustrating a node entity according to one embodiment of the present invention.

FIG. 5 illustrates a node 300 according to one embodiment of the present invention. The node comprises a controlling unit (CU) 302 which may be a microprocessor, Central Processing Unit, computer, etc. The controlling unit is electrically connected, e.g. via a data bus, to a storage unit (SU) 304, for storing data and computer software, and to receiving (RU) and transmitting units (TU) 306, 308 that are connected to other nodes, either in the same network as the node 300 or nodes of other networks, e.g. edge nodes of access networks, server nodes etc. The node is a TTG node configured to communicate initiation information related to a SIP-proxy server to an IMS-client stored in a user equipment (UE) via a WLAN. The node comprises receiving means 310 for receiving IPsec/IKE signalling from at least one UE, and means 312 for activating PDP-context signalling comprising a request for initiation information towards a GGSN node in response to the IPsec/IKE signalling. The node 300 is either configured with means 314a. for receiving from a GGSN node initiation information comprising a SIP-proxy server address information, e.g. P-CSCF-address, or, if the node is configured with the SIP-proxy server address, means 314b. for storing said address. The node is further comprising means 316 for receiving a DHCP-query concerning said SIP-proxy server address information from a UE after the IPsec/IKE signalling has been completed, and means 318 for transmitting said SIP-proxy server address information (P-CSCF-address) in response to the DHCP-query from the UE.

Figure 6:
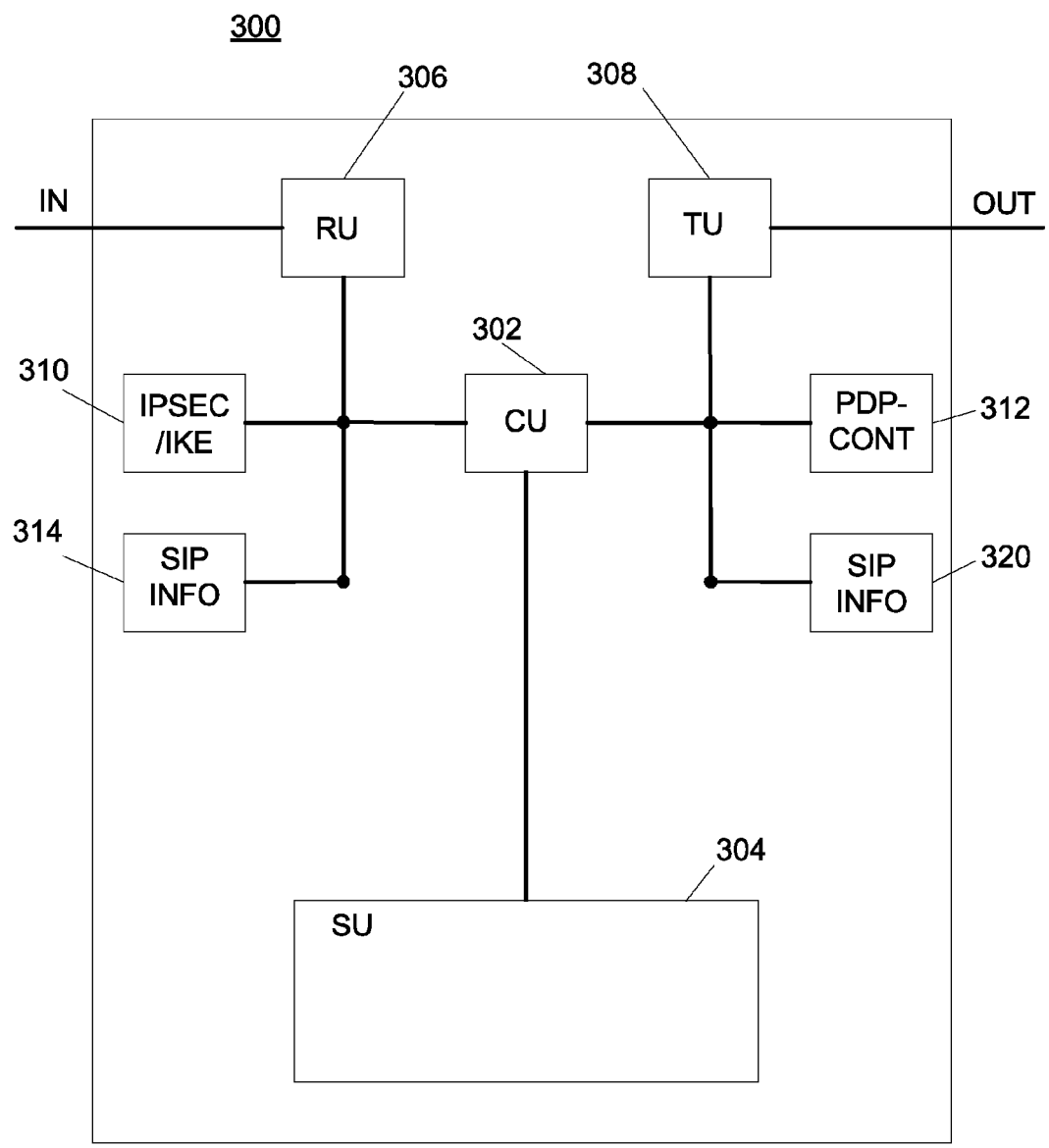
FIG. 6 is a block diagram illustrating a node entity according to further one embodiment of the present invention.

FIG. 6 illustrates another embodiment of the invention. The TTG node entity comprises a CU 302, a storage unit/storage device (SU) 304, receiving (RU) and transmitting units (TU) 306,308 and receiving means 310 for receiving IPsec/IKE signalling from at least one UE, and means 312 for activating PDP-context signalling comprising a request initiation information towards a GGSN node in response to said IPsec/IKE signalling. The node is configured with means 314 for receiving from the contacted GGSN node initiation information comprising at least one SIP-proxy server address information (P-CSCF address). The node is further comprising transmitting means 320 for transmitting during the finalization of the IPsec/IKE signalling procedure said SIP-proxy server address information (P-CSCF-address) to the UE.

The transmitting means TU is configured for putting said SIP-proxy server address information in the configuration payload during the configuration part of said IKEv2. signalling.

The node may also be configured for storing said SIP-proxy server address information when received in said PDP context signalling.

Figure 7:
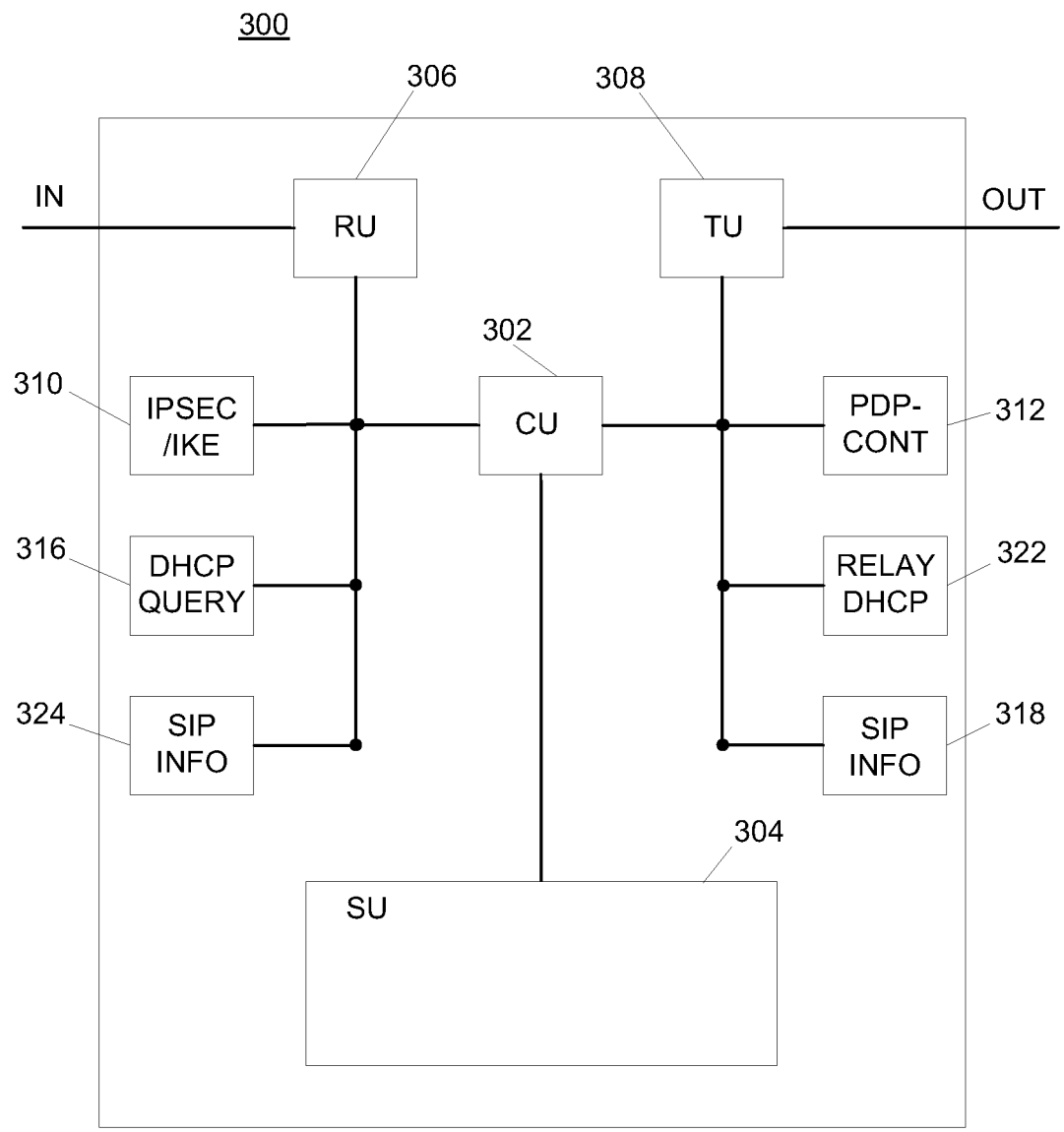
FIG. 7 is a block diagram illustrating a node entity according to yet another embodiment of the present invention.

FIG. 7 illustrates another embodiment of the present invention. The node 300 comprises a controlling unit (CU) 302 which may be a microprocessor, Central Processing Unit, computer, etc. The controlling unit is electrically connected, e.g. via a data bus, to a storage unit (SU) 304 for storing data and computer software. The TTG node entity 300 comprises receiving (RU) and transmitting units (TU) 306, 308 that are connected to other nodes, either in the same network as the node 300 or nodes of other networks, e.g. edge nodes of access networks, server nodes etc. The node is a TTG node configured to communicate initiation information of a SIP-proxy between an IMS-client stored in a user equipment (UE) and a Gateway GPRS Support Node (GGSN) via an Access Network (AN) and the node. The node is configured, see block means 310, for receiving IPsec/IKE signalling from said UE, and means 312 for activating PDP-context signalling comprising a request for initiation information towards the GGSN node in response to said UE IPsec/IKE signalling. Moreover, the node is adapted, means 316, to receive a DHCP-query concerning the SIP-proxy server address information from the UE after the IPsec/IKE signalling has been completed, and means 322 to relay the DHCP-query to a pre-defined node entity, comprising the SIP-proxy server address information, and the node is configured, means 324, for receiving a response comprising the requested SIP-proxy server address information. The node is configured to transmit, means 318, the SIP-proxy server address information (P-CSCF-address) in response to the DHCP-query to the UE.

The pre-defined node entity to which a DHCP-query is relayed may be a Gateway GPRS Support Node (GGSN) entity, or a Dynamic Host Configuration Protocol DHCP server.

The invention may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

A number of embodiments of the present invention have been described. It will be understood that various modifications may be made without departing from the scope of the invention. Therefore, other implementations are within the scope of the following claims defining the invention.

The invention claimed is:

1. A method for transmitting initiation information related to a SIP-proxy server between an IMS-client stored in a user equipment (UE) and a Gateway GPRS Support Node (GGSN) via a Access Network (AN) and a Tunnelling Termination Gateway (TTG) node of an IP core network, said method comprises following steps of:
   receiving IPsec/IKE signalling at said TTG node from said UE;
   activating PDP-context signalling comprising a request for initiation information towards said GGSN node in response to said UE IPsec/IKE signalling;
   receiving from said GGSN node initiation information comprising a SIP-proxy server address information;
   receiving at said TTG node a DHCP-query concerning said SIP-proxy server address information from said UE after said IPsec/IKE signalling has been completed; and
   transmitting from said TTG node said SIP-proxy server address information in response to said DHCP-query to said UE.

2. The method according to claim 1, further comprising storing said SIP-proxy server IP address when received in said PDP context signalling.

3. The method according to claim 1, wherein the SIP-proxy server address information is an IPv4 or IPv6 address.

4. The method according to claim 1, where the said SIP-proxy server address information is a Fully Qualified Domain Name (FQDN).

5. The method of claim 1, wherein the TTG terminates an IPsec tunnel established between the UE and the TTG.

6. The method of claim 1, wherein the TTG receives the IPsec/IKE signaling from said UE via a wireless local area network (WLAN).

7. A node configured to communicate initiation information related to a SIP-proxy server between an IMS-client stored in a user equipment (UE) and a Gateway GPRS Support Node (GGSN) via an Access Network (AN) and said node in an IP core network, the node comprising a receiver apparatus, a transmitter apparatus, and a processing apparatus and being configured for:
   receiving IPsec/IKE signalling from said UE;
   activating PDP-context signalling comprising a request for initiation information towards said GGSN node in response to said UE IPsec/IKE signalling;
   receiving from the GGSN node initiation information comprising a SIP-proxy server address information;
   receiving a DHCP-query concerning the SIP-proxy server address information from the UE after the IPsec/IKE signalling has been completed; and
   transmitting said SIP-proxy server address information in response to the DHCP-query to the UE.

8. A method for transmitting initiation information related to a SIP-proxy server between an IMS-client stored in a user equipment (UE) and a Gateway GPRS Support Node (GGSN) via a Access Network (AN) and a Tunnelling Termination Gateway (TTG) node in an IP core network, said method comprises following steps of:
   receiving IPsec/IKE signalling in said TTG node from said UE;
   activating PDP-context signalling comprising a request for initiation information towards said GGSN node in response to said UE IPsec/IKE signalling;
   receiving in said TTG node a DHCP-query concerning the SIP-proxy server address information from said UE after the IPsec/IKE signalling has been completed;
   relaying from said TTG node the DHCP-query to a pre-defined node entity comprising the SIP-proxy server address information;
   receiving a response in said TTG node comprising the requested SIP-proxy server address information; and
   transmitting from said TTG node said SIP-proxy server address information in response to said DHCP-query to said UE.

9. The method according to claim 8, wherein the pre-defined node entity to which the DHCP-query was relayed is a Gateway GPRS Support Node (GGSN) entity.

10. The method according to claim 8, wherein the pre-defined node entity to which the DHCP-query was relayed is a Dynamic Host Configuration Protocol server.

11. A Tunneling Termination Gateway (TTG) node configured to communicate initiation information related to a SIP-proxy server to a user equipment (UE), the TTG node comprising a receiver apparatus, a transmitter apparatus, and a processing apparatus and being configured for:
   receiving IPsec/IKE signaling from said UE;
   activating PDP-context signaling comprising a request for initiation information towards a Gateway GPRS Support Node (GGSN) in response to said UE IPsec/IKE signaling;
   receiving a DHCP-query from the UE after the IPsec/IKE signaling has been completed;
   relaying the DHCP-query to a pre-defined node entity;
   receiving a response comprising SIP-proxy server address information; and
   transmitting to the UE said SIP-proxy server address information in response to the DHCP-query.

12. The node according to claim 11, wherein the pre-defined node entity to which the DHCP-query was relayed is a Gateway GPRS Support Node (GGSN) entity.

13. The node according to claim 11, wherein the pre-defined node entity to which the DHCP-query was relayed is a Dynamic Host Configuration Protocol server.

14. A method for transmitting initiation information related to a SIP-proxy server to a user equipment (UE) of the method comprising:
- a Tunneling Termination Gateway (TTG) storing SIP-proxy server address information in a data store prior to receiving IPsec/IKE signaling from the UE;
- after storing the SIP-proxy server address information, the TTG receiving IPsec/IKE signaling transmitted from said UE;
- the TTG activating PDP-context signaling comprising a request for initiation information towards a Gateway GPRS Support Node (GGSN) in response to said IPsec/IKE signaling;
- the TTG receiving a DHCP-query concerning SIP-proxy server address information from said UE; and
- the TTG, in response to the DHCP-query, retrieving the stored SIP-proxy server address information from the data store and transmitting to said UE the retrieved SIP-proxy server address information.

15. A node configured to communicate initiation information related to a SIP-proxy server between an IMS-client stored in a user equipment (UE) and a Gateway GPRS Support Node (GGSN) via an Access Network (AN) and said node in an IP core network, the node comprising a receiver apparatus, a transmitter apparatus, and a processing apparatus and being configured for:
- receiving IPsec/IKE signalling from said UE, and
- activating PDP-context signalling comprising a request for initiation information towards said GGSN node in response to said UE IPsec/IKE signalling, wherein
- the node is further configured with initiation information comprising a SIP-proxy server address information, and
- the node is further adapted for receiving a DHCP-query concerning the SIP-proxy server address information from the UE after the IPsec/IKE signalling has been completed, and transmitting said SIP-proxy server address information in response to the DHCP-query to the UE.

* * * * *